United States Patent

[11] 3,609,502

| [72] | Inventors | Wilford B. Burkett<br>Pacific Palisades;<br>John H. Bigbee, III, Los Angeles, both of Calif. |
|---|---|---|
| [21] | Appl. No. | 844,469 |
| [22] | Filed | July 24, 1969 |
| [45] | Patented | Sept. 28, 1971 |
| [73] | Assignee | McCulloch Corporation<br>Los Angeles, Calif. |

[54] HIGH FREQUENCY BATTERY CHARGER EMPLOYING AN INVERTER
20 Claims, 8 Drawing Figs.

[52] U.S. Cl. .................................................. 320/5,
320/14, 320/21, 320/31, 320/57
[51] Int. Cl. ........................................................ H02j 7/10
[50] Field of Search........................................... 320/5,
9–11, 13, 14, 20–22, 39, 40, 57, 59

[56]        References Cited
    UNITED STATES PATENTS

| 2,555,630 | 6/1951 | Bishner .................... | 320/59 |
| 2,978,596 | 4/1961 | Robirds .................... | 320/59 |
| 2,980,842 | 4/1961 | Medlar .................... | 320/56 UX |
| 3,031,629 | 4/1962 | Kadri ...................... | 321/27 |
| 3,205,424 | 9/1965 | Bates ...................... | 321/27 |
| 3,242,414 | 3/1966 | Zelina ..................... | 320/39 |
| 3,293,445 | 12/1966 | Levy ...................... | 320/57 |
| 3,339,080 | 8/1967 | Howald .................... | 320/57 |
| 3,510,745 | 5/1970 | Futterer ................... | 320/56 |

*Primary Examiner*—Lee T. Hix
*Assistant Examiner*—John M. Gunther
*Attorney*—Christie, Parker & Hale ABSTRACT: A charger designed to be within a specified weight limitation employs a method and circuit for rapid-charging which circuit employs an inverter for changing a direct current voltage to an alternating-current voltage having a substantially square wave form and a relatively high frequency in the order of 10,000 Hertz, and a rectifying circuit connected to the output of the inverter, for changing the high frequency alternating-current voltage to direct-current voltage for application to the battery to be charged. At least one unilateral impedance element is in the current path through the rectifying circuit with the element briefly providing a discharge path for the battery at the end of each period of forward conduction through the element.

INVENTORS.
WILFORD B. BURKETT
JOHN H. BIGBEE, III
BY
Christie, Parker & Hale
ATTORNEYS

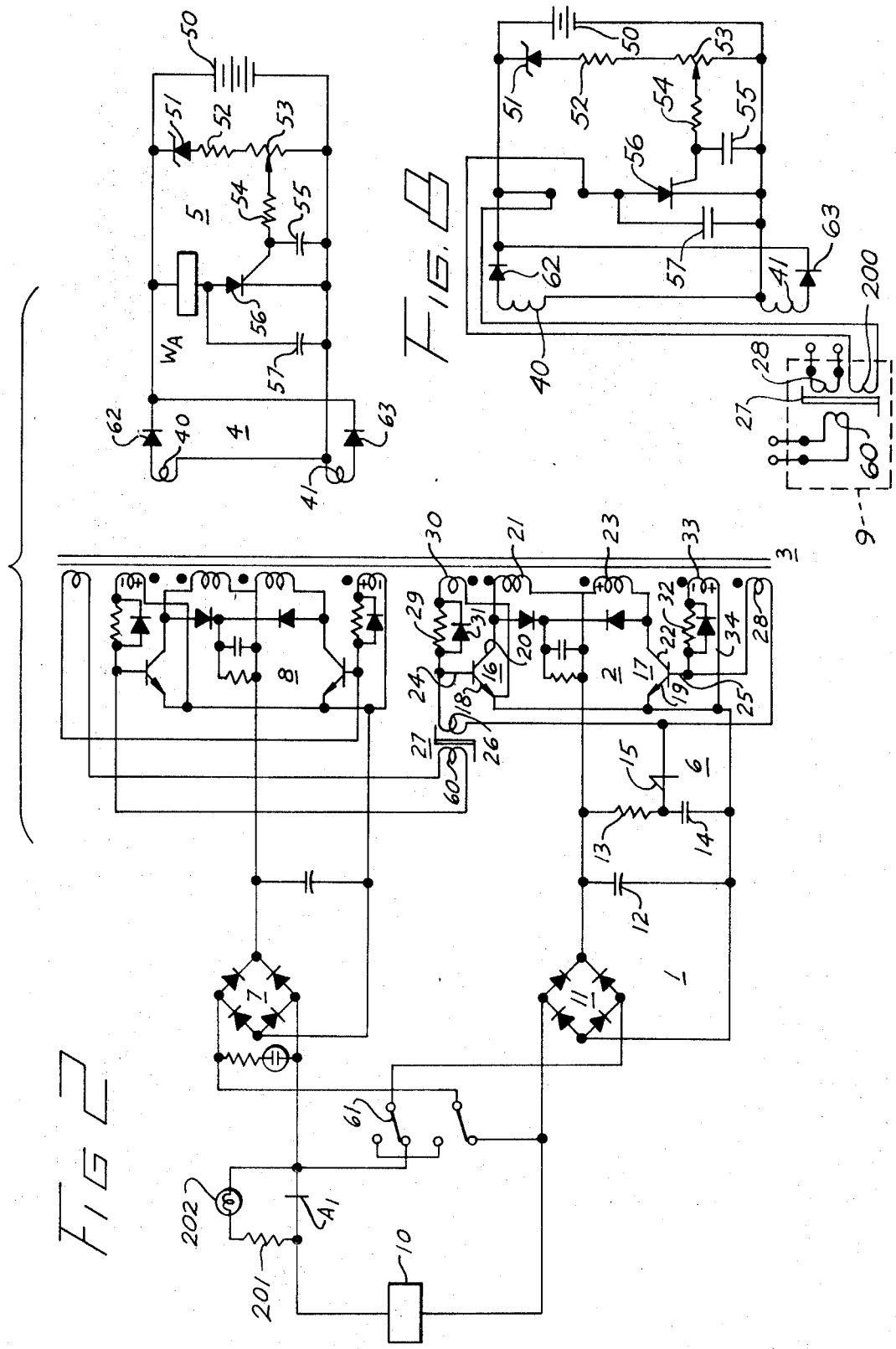

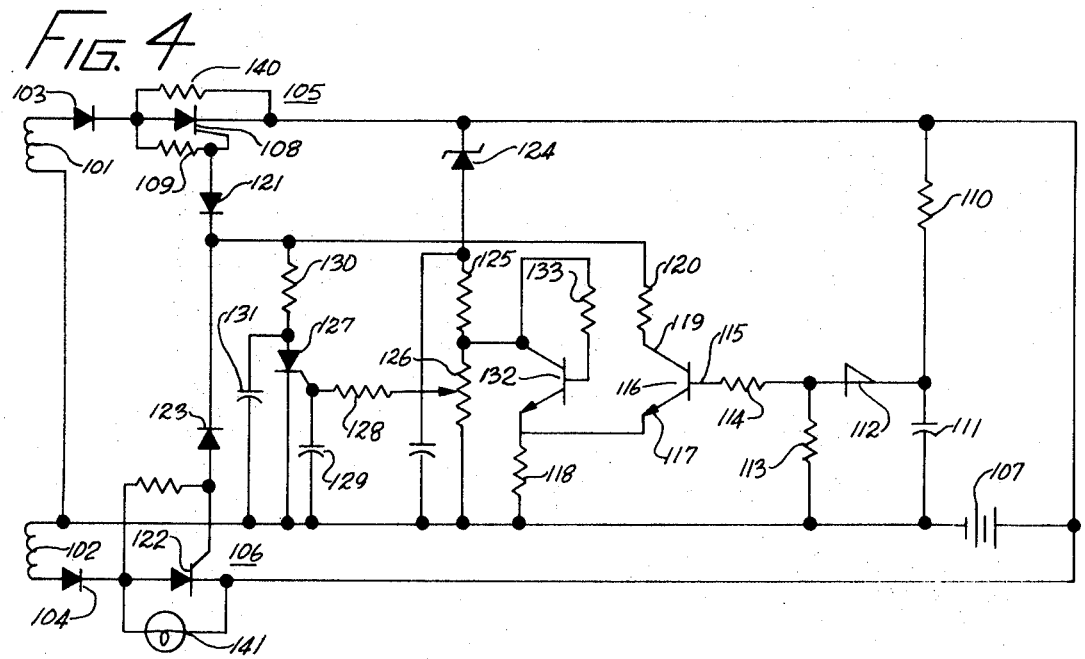
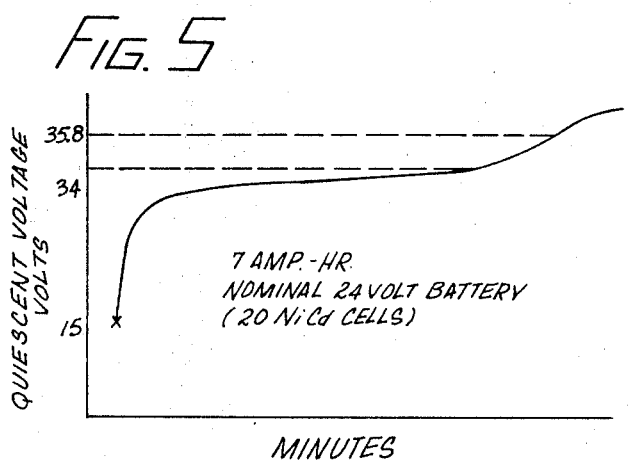
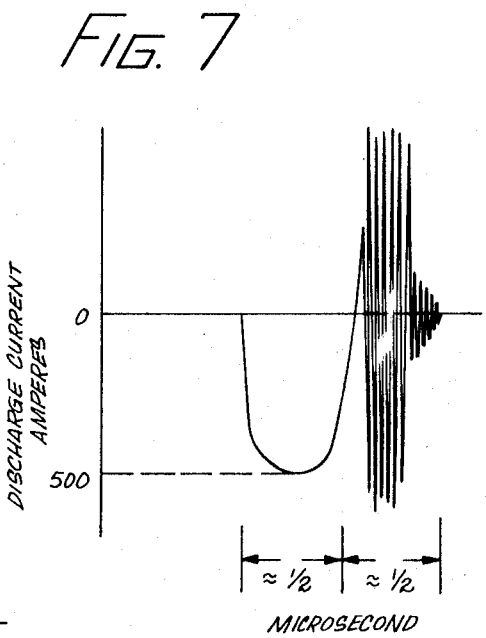
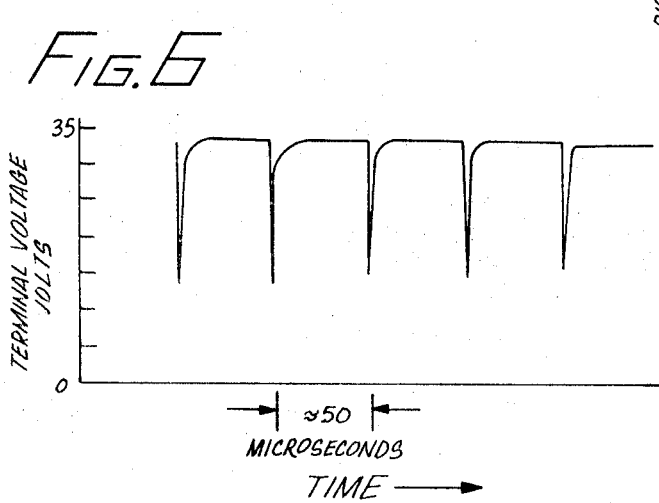

HIGH FREQUENCY BATTERY CHARGER EMPLOYING AN INVERTER

CROSS-REFERENCES TO RELATED APPLICATIONS

The invention herein is related to those disclosed and claimed in the copending U.S. applications Ser. No. 612,995 now U.S. Pat. No. 3,517,293 filed Jan. 31, 1967, and Ser. No. 726,060, now abandoned, filed May 2, 1968, and assigned to the same assignee as this application, and this invention incorporates the basic method of rapid-charging disclosed in these applications.

BACKGROUND OF THE INVENTION

Field of the Invention

This invention relates to a method and apparatus for rapid-charging batteries, and is particularly adapted to chargers having a weight and size limitation.

It has been found that batteries may be charged in considerably less time than the time that the battery manufacturers recommend for the charging of their batteries. As disclosed in the above-mentioned applications, batteries may be charged to 100 percent or more of rated capacity in less than 1 hour, and in many cases, in less than 15 minutes, by employing the method disclosed in the referred-to applications.

Basically, the method comprises imparting a progressively increasing charge to a battery by subjecting the battery to alternating charging and rest intervals, with a discharge pulse generally occurring during the rest interval. Where it is desired to use the commercial 110-volt source, as the source of power for charging the battery, and the battery voltage is considerably less than the available 110 volts, a transformer is generally used to step down the voltage to the desired lower voltage. However, as the capacity of the cells in the battery are increased so that the power requirements of the charger are increased, the size and weight of the transformer may become excessive. This is particularly true where the charger is to be used in airborne applications or the field, such as in military applications, and therefore should be readily transportable and oftentimes portable.

Additionally, it is oftentimes desirable to employ a higher voltage such as the 220-volt commercial source as well as an alternating-current voltage having a frequency other than 60 Hertz. For example, the available source may have a frequency of 50 Hertz or 400 Hertz.

SUMMARY OF THE INVENTION

In accordance with the present invention, batteries comprised of one or more cells are rapidly charged by converting direct-current voltage from a source to an alternating-current voltage and thereafter rectifying the alternating-current voltage and applying the rectified voltage to a battery through a transmission means having a switch means and a continuously operable electrical connection to the battery, and briefly discharging the battery through the switch means every time the alternating-current voltage drops below the battery voltage. Additionally, the rapid-charging of the battery may be terminated by removing the direct-current voltage in response to a function of the battery. Alternatively, the rapid-charging may be terminated by sampling the quiescent battery voltage as an integral function of battery terminal voltage to determine the state of charge of the battery, and terminating the rapid charge in response to the attainment of a predetermined quiescent battery voltage.

Further, in accordance with the present invention, batteries may be charged in a short period of time, for example in less than 30 minutes, with this time being reducible with the use of more expensive components with a relatively lightweight battery-charging circuit comprising at least one source means for supplying direct-current voltage, at least one inverter circuit for changing the direct-current voltage to an alternating-current voltage, which inverter circuit advantageously produces an alternating-current voltage having a frequency of approximately 10,000 Hertz, and a substantially square wave form, means for rectifying the alternating-current voltage with the rectifying means including at least one unilateral impedance element having a recovery time such that the element remains conductive for an interval after the alternating-current voltage decreases to less than the battery terminal voltage to provide a discharge path for the battery being charged, and transmission means operable to transmit the direct-current pulses from the rectifying means to the battery being charged.

The apparatus may further include means responsive to a predetermined battery terminal voltage for removing the voltage from the source means.

Alternatively, the battery-charging circuit may further include means responsive to a predetermined quiescent battery voltage for terminating the rapid charging of the battery, and means for simultaneously removing the voltage from the source means and applying at least a portion of the quiescent battery voltage to the terminating means as an integral function of battery terminal voltage.

As a third alternative for terminating rapid-charging the battery-charging circuit may further comprise means responsive to a predetermined quiescent battery voltage for terminating the rapid-charging of a battery being charged, and means responsive to an integral function of battery terminal voltage for simultaneously inhibiting the switch means in said transmission means and applying at least a portion of the quiescent battery voltage to the terminating means.

Alternatively, the terminating means may control a saturable transformer acting as the timing means in the inverter circuit for inhibiting the operation of the inverter in response to the attainment of a predetermined quiescent voltage.

The battery charger and circuit may further advantageously include two inverter circuits, and means for synchronizing the operation of these two inverter circuits. Further, the battery-charging circuit having two inverter circuits may further include switch means for selectively connecting two source means either in parallel or in series.

BRIEF DESCRIPTION OF THE DRAWINGS

The above and other features and advantages of the present invention may be understood more clearly and fully upon consideration of the following specification and drawings, in which:

FIG. 2 is a schematic diagram of a preferred embodiment of a circuit for rapid-charging a battery in accordance with the present invention;

FIG. 4 is a schematic diagram of a portion of a rapid-charging circuit in accordance with the present invention showing a second alternative control circuit therefor;

FIG. 5 is a chart showing the variations in quiescent battery voltage of a representative battery being charged by the circuit of FIG. 4, and the method in accordance with the present invention;

FIG. 6 is a chart representatively showing the variations in battery voltage on an expanded time scale of a typical battery being charged by the circuit of FIg. 4 and the method in accordance with the present invention;

FIG. 7 is a chart representatively showing the discharge current on an expanded time scale for the representative battery of FIGS. 5 and 6 being charged by the circuit of FIG. 4 and the method in accordance with the present invention; and FIG. 8 is a schematic diagram of an alternative means for terminating rapid charge in accordance with the present invention.

DESCRIPTION OF THE PREFERRED EMBODIMENTS

Figure 1:
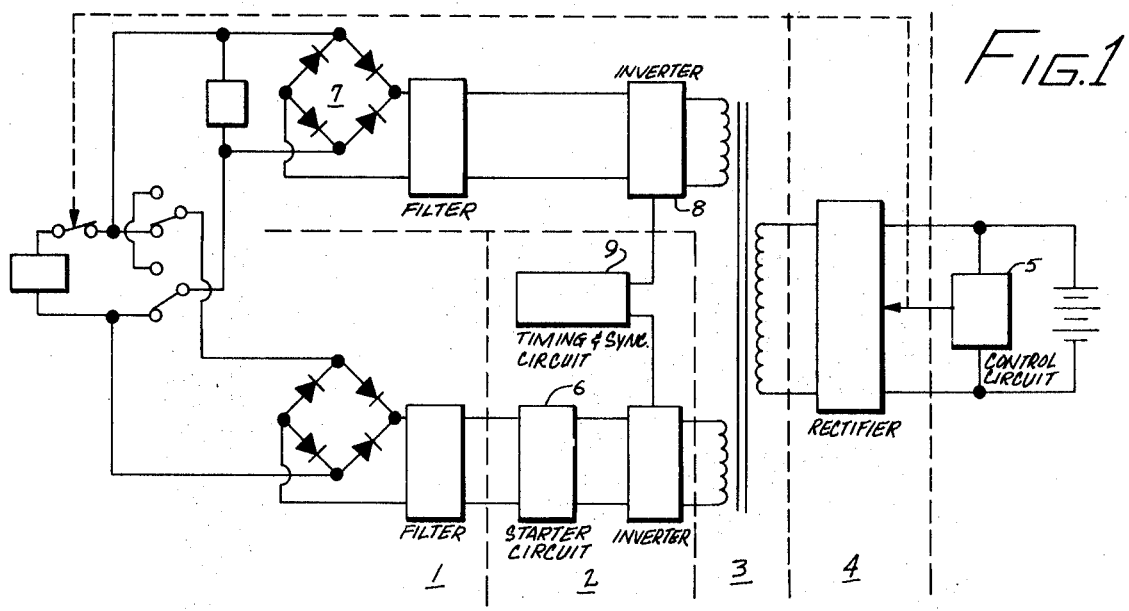
FIG. 1 is a combined block and schematic diagram, of a circuit for rapid-charging a battery in accordance with the present invention.

A battery-charging circuit that is relatively lightweight and employing the basic method of rapid charging of the above-mentioned applications, is shown in FIG. 1.

Considering the lower portion of FIG. 1, the rapid-charging circuit includes a source means 1 for providing a direct-current voltage, an inverter circuit 2 coupled to the source means, a transformer means 3, a rectifying means 4, and a control circuit 5.

The details of the source means 1 and inverter circuit 2 are shown in FIG. 2. The power source 1 includes a source of alternating-current voltage 10 which may be from a conventional 110 or 220-volt outlet and may have a frequency of 50, 60, or 400 Hertz of some other frequency. Alternating-current source 10 is connected to a bridge rectifier 11 which changes the alternating current to a pulsating direct-current voltage which is filtered by a capacitor 12.

The inverter circuit 2 is basically a two-transistor push-pull oscillator. A starting circuit 6 is provided for initiating the operation of the inverter 2. The starter circuit 6 includes a resistor 13 and capacitor 14, connected in series across the output of the rectifier 11, and a three-layer diode 15, connected to the junction of the resistor 13 and the capacitor 14. The combination comprises a typical relaxation timing circuit.

The inverter circuit 2 includes a power transistor 16 and a power transistor 17 having emitter junctions 18 and 19, respectively, connected to the negative side of the output of the bridge rectifier 11. The collector 20 of transistor 16 is connected through one winding 21 of the transformer means 3 and to the positive side of the bridge rectifier 11. The collector 22 of transistor 17 is similarly connected to the positive side of rectifier 11 through a winding 23 of transformer 3. The base 24 of transistor 16 is connected to the base 25 of transistor 17 through a winding 26 of a saturable transformer 27 and a small winding 28 on transformer 3.

The transistor 16 has a base drive circuit comprised of a resistor 29 and winding 30 of transformer 3 with the resistor 29 and the winding 30 being connected in series between the base 24 and the emitter 18. A diode 31 is connected across resistor 29 to reduce the transition interval at the time of switching of the transistors. Transistor 17 has a similar base drive circuit comprised of a resistor 32 and a winding 33 connected in series between base 25 and emitter 19 and a diode 34 connected across resistor 32.

The output of the inverter circuit 2 is coupled through the transformer 3 to a rectifier circuit 4. The rectifier circuit 4 is connected to the secondary windings 40 and 41 of transformer 3 and provides full wave rectification of the inverter output. The rectified output is applied to battery 50 that is to be charged. A control circuit 5 is connected between the rectifier 4 and the battery 50 for terminating the rapid-charging of the battery. The control circuit 5 includes a voltage divider circuit comprised of a Zener diode 51, a resistor 52, and a potentiometer 53 connected in series across the battery 50. The adjustable arm of potentiometer 53 is connected to a current-limiting resistor 54 in series with a capacitor 55. The control circuit further includes a silicon-controlled rectifier 56 and a relay winding $W_A$ connected in series across the rectifier 4 output and the battery 50. A capacitor 57 is connected across the silicon-controlled rectifier 56 to bypass transient voltages.

In operation, current flows from the output of rectifier 11 and filter capacitor 12 through resistor 13 to charge capacitor 14. When the exponentially increasing voltage across capacitor 14 reaches the firing threshold of three-layer diode 15 it conducts and drives the base of transistor 17 positive with a pulse approximately 2 microseconds in duration. The inductance of winding 28 is relatively low compared to the inductance of winding 26 so that the base of transistor 17 is selectively driven positive rather than the base of transistor 16. As transistor 17 is biased on and begins to conduct, collector current through winding 23 induces increasing flux in the core of transformer 3. This increasing flux causes current to flow in winding 33 which drives the base 25 of transistor 17 further positive. This increases the collector current through transistor 17 and the regenerative action quickly saturates transistor 17. Although the flux continues to increase in the core the driving current for base 25 is limited to a safe value by resistor 32.

The increasing voltage across winding 33 is also applied to base 24 of transistor 16 via winding 28 and winding 26 of saturable transformer 27. However, the voltage across winding 30 in the base drive circuit of transistor 16 is of opposite phase to that applied by winding 33 so that transistor 16 is biased beyond cutoff. The inductance of winding 26 of saturable transformer 27 limits current flow between the base drive circuits until the flux level in the transformer 27 reaches core saturation. The core of the saturable transformer 27 has very sharp corners in its hysteresis loop, and when it saturates, the inductance becomes very low, permitting the current through the winding 26 to increase rapidly. This current causes the voltage drop across resistor 32 to rise correspondingly so that transistor 17 is cut off. The flux induced by the current in winding 23 then rapidly decays, reversing rapidly the phase of the voltage across winding 30 and driving the base 24 of transistor 16 positive. The flux in the saturable transformer 27 also collapses very rapidly and the voltage thus induced in winding 26 quickly drives transistor 16 into saturation.

The previously conducting transistor 17, although driven toward cutoff, continues to conduct as long as carriers remain in the emitter base junction. Diode 34, which bypasses current in one direction around resistor 32, provides a path for dissipation of this stored charge and thus reduces the transition interval during which transistors 16 and 17 are both conducting. With the conduction of transistor 16 the current through winding 26 is reversed and the flux in the core of the transformer 27 is also reversed.

Upon the saturation of the core of the transformer 27 current through resistor 29 drives transistor 16 toward cutoff while the voltage induced in winding 33 provides a bias that begins to turn on transistor 17. The switching rate of the transistors 16 and 17 and thus the inverter frequency are controlled by the action of the saturable transformer 27. This transformer 27 and its windings make up the timing circuit 9 shown in block form in FIG. 1.

The transistors 16 and 17 in the inverter limit the voltage that can be applied to the inverter and the power that is available at the output of the inverter. However, at times it is desirable to have an output power that is greater than what may be provided by the presently available power transistors. To increase the power available for charging a battery and to increase the voltage that may be applied to the charging circuit, two inverter circuits are employed. However, more than two may be employed if higher power capabilities are desired.

The individual inverter circuits are connected to bridge rectifiers as shown in FIGS. 1 and 2. A bridge rectifier 7 (FIGS. 1 and 2) provides the direct-current voltage for an inverter 8 which cooperates with the bridge rectifier 11 and inverter 2 to give increased power and voltage capabilities. Inverter circuit 8 does not have a separate starter circuit but is initially pulses on through the use of a winding 60 of saturable transformer 27. The first time the flux in saturable transformer 27 collapses the voltage induced in its winding 60 drives the base of one of the transistors of inverter circuit 8 "on" and causes it to saturate quickly. Thereafter, the power transistors in inverter circuit 8 switch synchronously with the corresponding transistors 16 and 17 in inverter circuit 2. Thus, the power transformer 27 functions as both a timing means and a synchronizing means.

The bridge rectifiers 7 and 11 may be connected either in series or in parallel through a switch means 61 positioned between the bridge rectifiers and the source 10. The switch 61 is a double-pole, single-throw switch with the bridge rectifiers 7 and 11 being connected in parallel when the switch is in the position shown in FIG. 2. The rectifiers 7 and 11 are connected in series when switch 61 is moved to its other position.

Rectifier 4 includes diodes 62 and 63 which are selected to have a relatively fast recovery time, in the order of 50 microseconds or less. The cathodes of the diodes 62 and 63 are connected in common to form the positive output terminal of the rectifier to which the positive terminal of the battery 50 is connected.

In the method of rapid-charging batteries of the above-mentioned applications, a discharge path is provided to periodically discharge the battery to enhance the ability of the battery to accept a high-rate charge and to make the voltage rise at the end of charge to correlate with the state of charge of the battery. The discharge path in the present application is provided by the cooperation of the waveforms of the alternating-current output voltage from the inverters 2 and 8, and the recovery time of the diodes 62 and 63. The inverters 2 and 8 are designed to produce a substantially square wave alternating-current voltage which has a steep trailing edge having a short transition period between the positive and the negative pulse.

Employing diodes that have a recovery time of 50 microseconds, for example, in the rectifier 4, assures that the diode will remain conductive during the transition between a positive pulse and a negative pulse. With the current path still provided through diode 62 for example, after the voltage across winding 40 has reversed its polarity, the voltage across winding 40 combines with the voltage of battery 50 to provide a deep discharge pulse, in the range of 500 amperes or more. This pulse lasts for a very short time because its flow through the diode 62 functions to shut off the diode.

To prevent damage to the battery which may occur upon overcharging of the battery, control circuit 5 is employed. The battery terminal voltage is sensed by the voltage divider of Zener diode 51, resistor 52, and potentiometer 53. When the battery voltage reaches a predetermined value, the Zener diode will break down and permit conduction therethrough with the Zener diode remaining on during the continuing charge to the battery.

If the voltage developed across the portion of potentiometer 53 connected in the rectifier 56 gate circuit is above the threshold value of the silicon-controlled rectifier 56, it will be gated "on." Upon a gating "on" of silicon-controlled rectifier 56 current will flow from the junction of the cathodes of diodes 62 and 63 through the relay winding $W_A$ and the anode-cathode junction of rectifier 56. Current flow through winding $W_A$ will energize the relay, which has a normally closed contact $A_1$ in the current path from source 10. The energization of winding $W_A$ will cause contact $A_1$ to open with consequent removal of voltage to the charger from source 1 so that no further charging takes place.

The control circuit 5 will respond to the fluctuations in the voltage of battery 50, which is not as reliable an indicator of the state of charge of the battery as is the battery voltage when no charging current is flowing, which may be termed the quiescent battery voltage.

Figure 3:
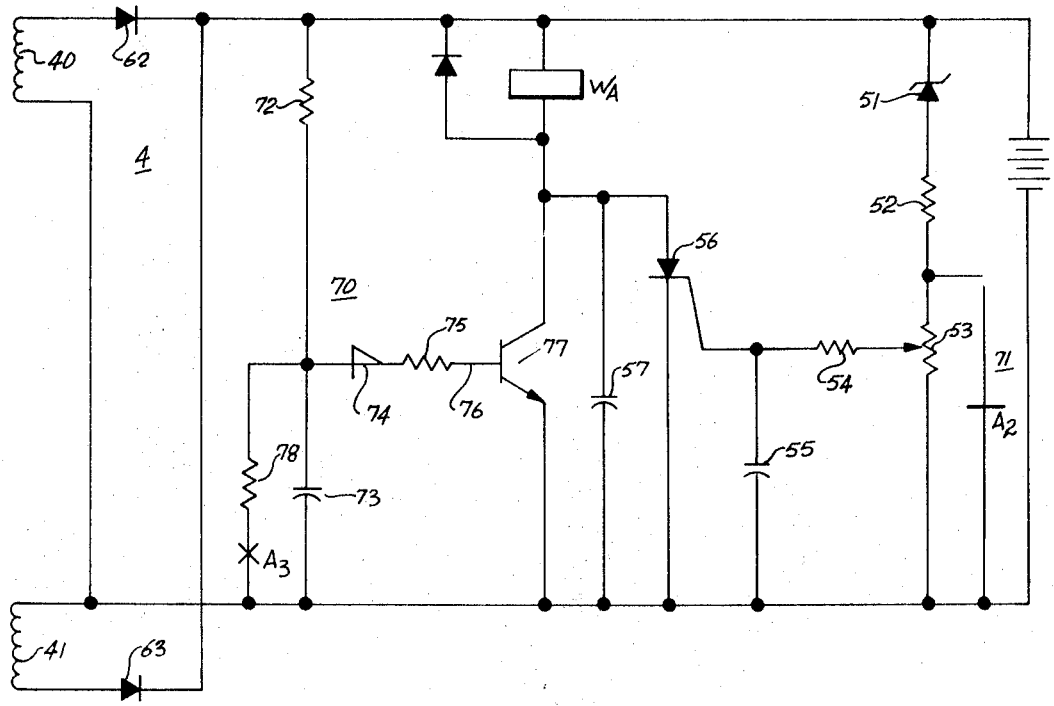
FIG. 3 is schematic diagram of a portion of a rapid-charging circuit in accordance with the present invention showing an alternative control circuit therefor.

An alternative control circuit that is responsive to the quiescent battery voltage is shown in FIG. 3. In the circuit of FIG. 3 the elements performing the same function as those of FIG. 2 carry the same reference numbers.

The circuit of FIG. 3 includes in addition to the components of the circuit of FIG. 2 a sampling circuit 70 and a shorting circuit 71, which includes a normally closed contact $A_2$ associated with relay winding $W_A$. The shorting circuit 71 is connected across potentiometer 53 so that the charge-terminating circuit, including silicon-controlled rectifier 56, is inhibited while contact $A_2$ is closed and is providing a shoring circuit around potentiometer 53.

Sampling circuit 70 includes a series combination of a resistor 72 and a capacitor 73 connected across the output of the rectifier 4. At the junction of the resistor 72 and capacitor 73 is connected a three-layer diode 74 in series with a current-limiting resistor 75. The current-limiting resistor 75 is connected to the base 76 of a transistor 77. The collector-emitter path of the transistor 77 is connected in series with the relay winding $W_A$ and across the silicon-controlled rectifier 56. A discharge path for capacitor 73 is provided by a resistor 78, which is connected in series with normally open contacts $A_3$ associated with relay winding $W_A$.

Upon an application of voltage to the rectifier 4 at the output of the inverters and a rectification thereof by rectifier 4, the pulsating direct-current voltage causes a current to flow through resistor 72 and capacitor 73, which begins to charge exponentially. When the charge on capacitor 73 reaches the threshold voltage of three-layer diode 74, it breaks down and places a positive voltage on the base 76 of transistor 77 to bias this transistor "on." The collector-emitter current through transistor 77 flows through relay winding $W_A$ to energize this relay. Upon the energization of relay winding $W_A$ contact $A_3$ closes to provide a discharge path for capacitor 73. The resistance of resistor 78 in the discharge path of capacitor 73 and the capacitance of the capacitor 73 determines the length of time that the transistor 77 is forward-biased, and therefore determines the dwell time of the relay $W_A$. The energization of relay winding $W_A$ by the collector-emitter current of transistor 77 opens the contact $A_1$ in the current path from source 10 to remove the charging current from the charging circuit.

Upon the removal of the charging current the battery voltage reduces to the quiescent level which is an accurate indication of the state of charge of the battery. A portion of the quiescent battery voltage is sensed by the gate of silicon-controlled rectifier 56 through resistor 54 and potentiometer 53 upon the opening of contact $A_2$ with the energization of relay winding $W_A$.

If the applied voltage is at or above the threshold voltage of the silicon-controlled rectifier 56 it will fire to hold the relay $W_A$ "on." Thus, the silicon-controlled rectifier 56 senses quiescent voltage and responds to the predetermined quiescent voltage for termination of the rapid-charging of the battery.

In some applications it may be desirable upon the termination of rapid-charging of the battery to continue the application of a trickle charge and for this purpose, a trickle charge path may be provided around the relay contact $A_1$ as shown in FIG. 2.

In certain applications it may be desirable to employ solid-state circuitry rather than electromechanical relays. A battery-charging circuit that employs solid-state circuitry for controlling the termination of rapid charge is shown in FIG. 4. The circuit of FIG. 4 is fed by one or more high-frequency inverters, as shown in FIGS. 1 and 2. The outputs of the high-frequency inverters are coupled through a transformer to the secondary windings 101 and 102 which may be a single center-tapped secondary winding. The opposite ends of windings 101 and 102 are connected to unilateral impedance elements or diodes 103 and 104, respectively, which function to rectify the alternating-current output. The diodes 103 and 104 are respectively connected to switch means 105 and 106 in a transmission means, which couples the rectified output to the positive terminal of the battery 107 being charged. The negative terminal of battery 107 is connected to the common terminal of windings 101 and 102 to complete the circuit.

The switch means 105 includes a silicon-controlled rectifier 108 and a biasing resistor 109 connected between the anode and gate of rectifier 108.

The circuit for terminating the rapid charge of the battery in response to a predetermined quiescent batter voltage includes the series connection of a resistor 110 and a capacitor 111 connected across the battery 107. A three-layer diode 112 is connected to the junction of resistor 110 and capacitor 111 and is returned to the negative side of the battery 107 through a resistor 113. A current-limiting resistor 114 connects the three-layer diode 112 to the base 115 of a transistor 116. The emitter 117 of transistor 116 is connected to the negative side of battery 107 through a resistor 118. The collector 119 of transistor 116 is connected through a resistor 120 and a diode 121 to the gate of silicon-controlled rectifier 108. The collector 119 is also connected through resistor 120 to the gate of a silicon-controlled rectifier 122 of switch means 106 through a diode 123.

A voltage divider comprised of the series connection of a Zener diode 124, resistor 125 and potentiometer 126 is connected across the battery 107. A portion of the voltage developed across potentiometer 126 is applied to the gate of a silicon-controlled rectifier 127 through a current-limiting resistor 128 which is returned to ground through a bypass capacitor 129 for filtering of transient signals. The silicon-controlled rectifier 127 is connected to the common cathodes of diodes 121 and 123 through a resistor 130. A capacitor 131 is connected between the anode and cathode of rectifier 127 to bypass transient voltages. A transistor 132 is connected across potentiometer 126 in series with the resistor 118 to provide a low-resistance path around potentiometer 126 to inhibit the operation of silicon-controlled rectifier 127 while the transistor 132 is conducting. Transistor 132 has a bias resistor 133 connected between its collector and base.

In operation, the high-frequency square wave alternating-current voltage from the inverter is coupled through the windings 101 and 102 to the rectifying diodes 103 and 104.

For purposes of illustration it is assumed that the battery 107 to be charged is a even ampere-hour battery having a nominal voltage of 24 volts. It is further assumed that this battery is made up of 20 nickel-cadmium cells and that the battery has been discharged to an end voltage of approximately 15 volts. The charging curve of such a battery, while being charged from the circuit of FIG. 4, is representatively shown in FIG. 5.

The voltage variation during the charging interval and the discharging interval are not shown on the curve in FIG. 5, but only the quiescent battery voltage is shown. It has been found that when employing the method of the present invention the quiescent battery voltage is a good indicator of the state of charge of a battery and it has also been found that the quiescent battery voltage rises very rapidly as the full charge condition is approached. This is shown on the quiescent battery voltage curve in FIG. 5.

As in the circuits of FIGS. 2 and 3, discharge pulses from the battery 107 are provided through the rectifying diodes 103 and 104, and in the case of the circuit of Fig. 4, through the silicon-controlled rectifiers 108 and 122. A typical discharge curve for a 24-volt battery being charged by the circuit of FIG. 4 is shown in FIG. 7 on an expanded time scale relative to the time scale of FIg. 5. The duration of the discharge pulse is determined by the transition time of the alternating-current voltage at the output of the inverter and the recovery time of the diode 103 and its associated silicon-controlled rectifier 108 and diode 104, and its associated silicon-controlled rectifier 122.

Considering the action of diode 103 and silicon-controlled rectifier 108 in changing from the conductive to the nonconductive state the following takes place.

Initially, the upper terminal of winding 101 is positive with respect to the lower terminal, and if the voltage present exceeds the battery terminal voltage, the diode 103 will be forward biased. Similarly, the rectifier 108 will be forward biased and will be turned on by gate current flowing through resistor 109. Thereafter, the charging current to the battery 107 flows through the forward biased and conducting diode 103 and rectifier 108.

The battery terminal voltage during the application of charging current increases slightly and tends to follow the square wave form of the applied voltage from the inverters. This battery terminal voltage is representatively shown in FIG. 6. When the input voltage form the inverter begins to switch polarity, the transition from positive to negative at the top terminal of winding 101 may take place in the matter if microseconds.

A fast-recovery diode nominally having a recovery time of approximately 50 microseconds and a silicon-controlled rectifier generally having a longer recovery time remain in their conductive state although no longer forward biased. Since diode 103 and rectifier 108 remain in their conductive state as they see the combination of the voltage across winding 101 in series-aiding with the voltage of battery 107, a large discharge current will flow from the battery through the elements. This reverse current will tend to drive the rectifier 108 and the diode 103 rapidly into their nonconductive state.

A fast-recovery diode in the context of this invention is a diode having a nominal recovery time of 50 microseconds which cooperate with the rapid transition of voltage polarity of the input from the inverter to give the desired discharge pulse. Because of the magnitude of the discharge current from the battery through the diode in the reverse direction recovery is effective in approximately ½ microsecond.

In one typical example for a 24-volt seven ampere-hour battery of nickel-cadmium cells as shown in FIG. 7, a discharge current having a peak value of approximately 500 amperes flowed for approximately ½ microsecond and was followed by an oscillatory current having a peak-to-peak value of approximately 1,200 amperes which existed for approximately ½ microsecond. The discharge current causes the battery terminal voltage to decrease substantially as shown on the curve in FIG. 6, which discharge enhances the ability of the battery to continue to accept the high-current rate of charge for rapid-charging.

As charging current flows into the battery 107 current also flows through resistor 110 to charge capacitor 111. When the voltage across capacitor 111 reaches the breakdown potential of diode 112, the diode begins to conduct.

During the early states of charging where the quiescent battery voltage is lower, the breakdown of the diode 112 occurs approximately every 60 seconds. However, as the battery quiescent voltage increases as the charge progresses the breakdown of the diode 112 occurs more frequently and will increase to a rate of approximately once every 2 seconds. Upon the conduction of current through diode 112, transistor 116 is biased on and is driven into saturation for approximately 1 to 4 milliseconds.

Collector current for transistor 116 flows through resistor 120 from the common cathode junction of diodes 121 and 123. This current flow prevents the silicon-controlled rectifiers 108 and 122 from being gated "on" during this 1- to 4-millisecond sampling period. By preventing the rectifiers 108 and 122 from being gated "on" the rapid-charging is interrupted so that the quiescent battery voltage appears across the control circuit.

Transistor 132 is generally continuously saturated by current feeding its base from the anode of Zener diode 124. However, when transistor 116 is biased "on" a positive voltage appears at the emitter of transistor 132 so tat it turns off. Upon the turning off of transistor 132 a portion of the quiescent battery voltage is applied to the gate of silicon-controlled rectifier 127 through resistor 128 and potentiometer 126.

If the sampled voltage applied to gate of rectifier 127 has not reached the predetermined level, rectifier 127 will not conduct and charging will resume at the high rate upon the expiration of the sampling interval. When the predetermined level is reached and is applied to the rectifier 127 this rectifier will fire and draw off current through diodes 121 and 123 to inhibit the silicon-controlled rectifiers 108 and 122, thereby terminating the rapid charging of the battery. Trickle charge, however, may be thereafter applied to the battery through a resistor 140 connected across rectifier 108 and an indicator lamp 141 connected across rectifier 122. When employing the trickle path, and in particular indicator lamp 141, the termination of rapid charge may be detected by an increase in the intensity of the lamp 141.

Alternatively, the rapid-charging may be terminated by controlling the operation of the inverter circuit, while maintaining the desirable isolation between input and output circuits. A circuit that performs this function is shown schematically in FIG. 8.

The circuit of FIG. 8 is similar to the circuit of FIG. 2 with the components that perform the same function in both figures having the same reference number. However in FIG. 8, the silicontcontrolled rectifier 56 anode current flows through an added winding 200 of saturable transformer 27, in the timing and synchronization circuit 9, keeping it saturated and thus inhibiting the power transistors of the inverters 8 and 2 from further conduction.

Different means for converting to a trickle charge from a rapid charge are shown in the circuits of FIGS. 2 and 3. For example, a relatively high resistance path formed by a series resistor 201 and indicator lamp 202 is connected across contacts $A_1$ in FIG. 2. With the use of the solid-state circuitry of FIG. 4, the trickle charge path is provided by resistor 140 around silicon-controlled rectifier 108 and lamp 141 around silicon-controlled rectifier 122.

In the battery charger circuits of FIGS. 2, 3, and 4, the repetition rate of the discharge pulses increases as charge progresses because of an increase in the frequency of the output of the inverter caused by the fact that the charging circuit draws less current as the battery voltage increases.

Various changes may be made in the details of construction without departing from the spirit and scope of the invention as defined by the appended claims.

What is claimed is:

1. A method of rapidly charging a battery comprising:
converting direct-current voltage from a source to an alternating-current voltage,
rectifying the alternating-current voltage and applying the pulsating rectified voltage to a battery through a transmission means having a continuously operable, electrical connection and switch means, and
discharging the battery through the switch means every time the alternating-current voltage drops below the battery voltage.

2. A method in accordance with claim 1 further comprising removing the direct-current voltage in response to a function of said battery.

3. A method in accordance with claim 1 further comprising sampling the quiescent battery voltage as an integral function of battery terminal voltage and reducing the current through the battery in response to the attainment of a predetermined quiescent battery voltage.

4. A rapid battery-charging circuit comprising at least one source means for supplying direct-current voltage, at least one inverter circuit for changing the direct-current voltage to an alternating-current voltage, means for rectifying the alternating-current voltage, said rectifying means including at least one unilateral impedance element having a recovery time such that said element remains conductive for an interval after the alternating-current voltage decreases to less than the battery terminal voltage to provide a discharge path for the battery being charged, and transmission means operable to transmit the direct-current pulses from said rectifying means to a battery.

5. A battery-charging circuit in accordance with claim 4 further comprising means responsive to a predetermined battery terminal voltage for removing the voltage from said source means.

6. A battery-charging circuit in accordance with claim 4 further comprising means responsive to a predetermined quiescent battery voltage for terminating the rapid-charging of the battery, and means for simultaneously removing the voltage from said source means and applying at least a portion of the quiescent battery voltage to said terminating means as an integral function of battery terminal voltage.

7. A battery-charging circuit in accordance with claim 4 wherein said transmission means includes at least one switch means further comprising means responsive to a predetermined quiescent battery voltage for terminating the rapid charging of a battery, and means responsive to an integral function of battery terminal voltage for simultaneously inhibiting the switch means in said transmission means and applying at least a portion of the quiescent battery voltage to said terminating means.

8. A battery-charging circuit in accordance with claim 4 further comprising means responsive to a predetermined quiescent battery voltage for terminating the rapid charging of the battery being charged, means for generating a first battery-function-responsive control signal, and circuit means responsive to said control signal for simultaneously inhibiting the application of charging current to a battery through said transmission means and applying at least a portion of the quiescent battery voltage to said terminating means.

9. A battery-charging circuit in accordance with claim 8 wherein said signal generating means includes capacitor means for integrating a current related to battery terminal voltage with respect to time.

10. A battery-charging circuit in accordance with claim 4 further comprising means for synchronizing the operation of two inverter circuits.

11. A battery-charging circuit in accordance with claim 10 further including switch means for selectively connecting two source means either in parallel or in series.

12. A battery-charging circuit in accordance with claim 4 wherein said inverter circuit includes a saturable transformer having at least two windings, one winding being connected for controlling the timing of the inverter, and further comprising means responsive to a predetermined quiescent battery voltage connected to the second winding on said transformer for saturating said transformer and inhibiting the operation of said inverter, and means for applying a portion of the quiescent battery voltage to said saturating means.

13. A method of rapidly charging a battery comprising the steps of applying a pulsating direct-current signal to a battery through a continuously operable switch; and reversing the direction of current flow through the battery and the switch between the application of pulses of the direct-current signal to the battery.

14. The method of claim 13 wherein the pulses of the direct-current signal have a substantially vertical trailing edge.

15. The method of claim 13 wherein the pulsating direct-current signal is generated by periodically inverting a direct-current signal to provide an alternating-current signal and thereafter rectifying the alternating-current signal.

16. The method of claim 13 including the steps of sensing a condition of the battery and inhibiting the application of the pulsating DC signal to the battery in response to the attainment of a predetermined value of the condition sensed.

17. The method of claim 13 wherein the current through the battery and the switch is reversed responsively to the relative amplitude of the individual pulses in the pulsating direct-current signal and the voltage of the battery.

18. A method of rapidly charging a battery comprising:
the steps of applying a pulsating direct-current signal to a battery through a continuously operable switch; and
reversing the direction of current flow through the battery and the switch in response to the relative amplitude of the pulses in the pulsating direct-current signal and the voltage of the battery.

19. A rapid-charge circuit for a battery comprising means for generating an alternating-current voltage having a peak value in excess of the terminal voltage of the battery to be charged; means for rectifying the alternating-current voltage, said rectifying means including at least one switch means having a recovery time such that said switch means remains conductive for an interval after the alternating-current voltage decreases to less than the battery terminal voltage to provide a discharge path for the battery being charged; and transmission means operable to transmit the direct current pulse from said rectifying means to the battery to be charged.

20. A rapid-charge circuit in accordance with claim 19 further including means for sensing a condition of the battery being charged and means for inhibiting the transmission of direct-current pulses to the battery in response to the attainment of a predetermined condition.

PO-1050
(5/69)

UNITED STATES PATENT OFFICE
CERTIFICATE OF CORRECTION

Patent No. 3,609,502      Dated September 28, 1971

Inventor(s) Wilford B. Burkett and John H. Bigbee, III

It is certified that error appears in the above-identified patent and that said Letters Patent are hereby corrected as shown below:

```
Col. 2, line 67, "FIg." should be --FIG.--.
Col. 3, line 15, change "of" to --or--.
Col. 4, line 60, change "pulses" to --pulsed--.
Col. 5, line 49, after "source", change "1" to --10--;
Col. 5, line 67, change "shoring" to --shorting--.
Col. 6, line 64, change "batter" to --battery--.
Col. 7, line 24, change "even" to --seven--;
Col. 7, line 68, change "form" to --from--;
Col. 7, line 70, change "if" to --of--.
Col. 8, lines 42 and 43, change "1-to 4-millisecond"
                to --one to four millisecond--;
Col. 8, line 51, change "tat" to --that--.
Col. 9, line 2, delete the"t" between "silicon controlled";
Col. 9, line 46, after "voltage" insert -- having a peak value in
                excess of the terminal voltage of the
                battery being charged. --.
```

Signed and sealed this 9th day of May 1972.

(SEAL)
Attest:

EDWARD M. FLETCHER, JR.            ROBERT GOTTSCHALK
Attesting Officer                   Commissioner of Patents